United States Patent
Eytchison

(10) Patent No.: US 9,948,517 B2
(45) Date of Patent: Apr. 17, 2018

(54) METHODS AND APPARATUSES FOR DISCOVERY AND NOTIFICATION OF SERVICES

(71) Applicants: Sony Corporation, Tokyo (JP); Sony Electronics Inc., Park Ridge, NJ (US)

(72) Inventor: Edward Eytchison, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 46 days.

(21) Appl. No.: 14/686,655

(22) Filed: Apr. 14, 2015

(65) Prior Publication Data

US 2015/0326443 A1    Nov. 12, 2015

Related U.S. Application Data

(63) Continuation of application No. 10/763,869, filed on Jan. 22, 2004, now Pat. No. 9,009,290.

(51) Int. Cl.
*G06F 11/00* (2006.01)
*H04L 12/24* (2006.01)
*H04L 12/26* (2006.01)
*H04L 29/08* (2006.01)

(52) U.S. Cl.
CPC .............. *H04L 41/12* (2013.01); *H04L 43/10* (2013.01); *H04L 67/16* (2013.01); *H04L 69/329* (2013.01)

(58) Field of Classification Search
CPC ....... H04L 67/16; H04L 69/329; H04L 41/12; H04L 43/10

USPC ................ 709/224, 229, 217–219; 707/10, 1
See application file for complete search history.

(56) References Cited

U.S. PATENT DOCUMENTS

| | | | |
|---|---|---|---|
| 5,999,940 A | 12/1999 | Ranger | |
| 6,618,764 B1 | 9/2003 | Shteyn | |
| 7,127,455 B2 * | 10/2006 | Carson | ................... G06Q 50/10 |
| 7,343,409 B1 | 3/2008 | Kremer et al. | |
| 7,496,637 B2 | 2/2009 | Han et al. | |
| 9,009,290 B2 * | 4/2015 | Eytchison | ............... H04L 67/16 |
| | | | 709/217 |
| 2002/0143819 A1 | 10/2002 | Han et al. | |
| 2003/0187841 A1 | 10/2003 | Zhang et al. | |
| 2004/0093326 A1 * | 5/2004 | Carson | ................... G06Q 50/10 |
| 2004/0267590 A1 | 12/2004 | Clark et al. | |
| 2005/0080768 A1 * | 4/2005 | Zhang | ............... G06F 17/30864 |
| 2009/0094453 A1 | 4/2009 | Bradley et al. | |
| 2010/0005513 A1 | 1/2010 | Bradley et al. | |
| 2010/0017606 A1 * | 1/2010 | Bradley | ............. G06Q 20/1235 |
| | | | 713/168 |

* cited by examiner

*Primary Examiner* — Kenneth R Coulter
(74) *Attorney, Agent, or Firm* — Haverstock & Owens LLP

(57) ABSTRACT

Methods and apparatuses for discovery and notification of services are described for creating a service, discovering the service, and providing notification of the service. In one embodiment, the methods and apparatuses for discovery and notification of services identifies a content provider; identifies a service wherein the service corresponds with the content provider; forms a service record within the service registry wherein the service record represents the service; and allows a content user to discover the service through the service registry.

30 Claims, 9 Drawing Sheets

METHODS AND APPARATUSES FOR DISCOVERY AND NOTIFICATION OF SERVICES

RELATED APPLICATIONS

This application is a continuation of co-pending U.S. patent application Ser. No. 10/763,869 filed on Jan. 22, 2004, titled, "METHODS AND APPARATUSES FOR DISCOVERY AND NOTIFICATION OF SERVICES," which is hereby incorporated by reference in its entirety for all purposes.

FIELD OF INVENTION

The present invention relates generally to discovering services and, more particularly, to discovering services through a network.

BACKGROUND

With the proliferation of computer networks, in particular the Internet, there are an increasing number of applications directed toward displaying content. In addition, there is a proliferation of unique web based approaches and proprietary technologies for distributing audio/visual content and services. Many proprietary solutions exist to view audio/visual content. However as competing proprietary solutions have flourished, the ability to discover and view incompatible audio/visual content and services has been increasingly difficult for users.

For example, a typical user is responsible for finding the appropriate solution to view a specific audio/visual content and service. Without the appropriate solution that corresponds to the specific content and service, the user may not be able to view the content.

Because of the nature of these propriety solutions and the constant proliferation of new proprietary solutions, it has been difficult for users to discover and receive incompatible audio/visual content and services across dissimilar boundaries.

SUMMARY

Methods and apparatuses for discovery and notification of services are described for creating a service, discovering the service, and providing notification of the service. In one embodiment, the methods and apparatuses for discovery and notification of services identifies a content provider; identifies a service wherein the service corresponds with the content provider; forms a service record within the service registry wherein the service record represents the service; and allows a content user to discover the service through the service registry.

Embodiments of the invention allow seamless discovery, classification, and engagement of services (e.g., services providing audiovisual content items) in networks (e.g., ubiquitous, non-homogeneous networks such as those connected via The Internet, or locally defined networks). Embodiments allow network applications (e.g., run-time applications on computing platforms such as personal computers or consumer electronic devices) to discover and integrate two or more content services into the application. In one illustrative embodiment, an application first discovers, classifies, and authenticates a service. The application subsequently engages the content provided by the service to present, for example, an audiovisual entertainment experience for a viewer. Discovery, classification, authentication, and engagement is facilitated by a registry system.

The registry system consists of one or more registry nodes accessible via a communication network. In an illustrative regional or global system accessible, e.g., via The Internet, two or more registry nodes are arranged in levels. One node functions as a root registry node and other, distributed nodes branch from the root registry node. Other node interconnection topologies may be used. An illustrative network application discovers services registered at the various service nodes, categorizes the discovered services based on, e.g., predefined genre information and/or other metadata, authenticates the discovered services, and determines how to engage the discovered services. Embodiments use, for example, standard Internet Engineering Task Force (IETF) or World Wide Web Consortium (W3C) protocols to perform such tasks.

At a single registry node, a service provider registers available content that defines one or more provided services. A single content item may, in some instances, be associated with two or more services. The service provider also registers a recipient list of clients that wish to receive notice of newly available services. Once the registration process is complete, clients on the recipient list receive notification that the new service is available. In addition, the newly registered service is discoverable and is available to clients not on the recipient list but that have access to the registry node via the network. The recipient list is optional, and in some instances a service provider registers a service only for discovery.

In an illustrative local system, which may also be accessible via The Internet, only a single registry node is used. Thus embodiments of the registry system are scalable so that some can be kept private to local communities rather than be made globally available. In some instances, a client copies information from a global registry node to a local registry node to speed engagement of frequently engaged services.

To facilitate query, discovery, and access to registered services, an illustrative embodiment of registration information at each registry node is organized into subgroups. In one instance, for example, the top level subgrouping contains provider information records. One provider information record exists for each registered service provider. The provider information record contains general information about the registered service provider, such as the service provider's identification (e.g., a globally unique service provider identification code). The provider information record also contains a reference of services provided by the service provider.

Each of the one or more registered services that are provided by a service provider is subgrouped as one or more corresponding service records. Each service record is given a unique service identification code that identifies the service type. The service identification code is used, for example, to discover a service type for specific service providers. Service records further include information such as for digital rights management and viewer suitability rating. In addition, service records include references to a subgroup of genre records.

Genre records are aligned with specific content item topic categories. Genre records contain specific genre identification information (e.g., types of music, events such as birthdays and graduations). Genre records also contain references to a subgroup of metadata records.

Metadata records contain information unique to a specific content item. For example, an illustrative metadata record contains a descriptive title for the content item, as well as the creator's name and the date of creation. The metadata record also contains references to a subgroup of engagement records that an application accesses in order to engage (access) a particular content item.

An engagement record contains information, e.g., supported content data streaming protocols, that assists the application to engage content item. Engagement records are not necessarily unique to a particular content item, since many content items may require identical engagement information.

The described provider information record, service record, genre record, metadata record, and engagement record subgroups are illustrative. Other service registry subgroupings may be used in other embodiments.

The service provider hosts and maintains the provided service by providing at least the minimum necessary information (either manually (e.g., a title) or automatically (e.g., software that identifies network addresses or supported protocols)) for the service registry subgroupings that allow the service to be discovered, classified, and engaged. Once the service provider gives the necessary information to the service registry, a certification authority authenticates the information and issues a digital certificate that authenticates the registry records. Registry record authentication verifies that the service information has not been altered. Once the information is verified, the newly registered service is published in the service registry and is made available to clients.

An illustrative embodiment consists of a service provider (father on computing platform "Dad") and two clients (father's brother on computing platform "Uncle" and father's mother on computing platform "Grandma"). Father makes audiovisual moving picture recording and takes a set of still image photographs at his son Johnny's birthday party. Father decides to provide the audiovisual and still image content items as services. As content provider "Dad", father registers the audiovisual recording as one service and the set of still image photographs as a second service at a service registry node. Father provides, for example, titles ("Video of Johnny's 4th Birthday"; "Photos of Johnny's 4th Birthday"), and other information necessary to register the two services. In this example, each unique content item is associated with a corresponding unique service, but in other instances two or more content items are associated with a single service. Father also registers client "Grandma" as a recipient, since he knows that his mother wants to immediately see everything about Johnny. When registration is complete, the service registry system sends an electronic message to Grandma that announces that Dad's two new services are available. Grandma can then access Dad's services and engage the associated content items. Father's brother is also interested in Father's son, and so Uncle initiates a query for information about Johnny (specifying, for example, service provider "Dad" and an audiovisual service type). Uncle's query first examines a local service registry, and if nothing is found, searches through global service registries. Once Dad's audiovisual service is located, the necessary registration information is authenticated and is sent to Uncle and to Uncle's local service registry repository for later fast access. Uncle then engages the audiovisual recording of Johnny's birthday.

BRIEF DESCRIPTION OF THE DRAWINGS

The accompanying drawings, which are incorporated in and constitute a part of this specification, illustrate and explain one embodiment of the methods and apparatuses for discovery and notification of services. In the drawings.

DETAILED DESCRIPTION

The following detailed description of the methods and apparatuses for discovery and notification of services refers to the accompanying drawings. The detailed description illustrates embodiments of the methods and apparatuses for discovery and notification of services and not intended to construct limitations. Instead, the scope of the invention is defined by the claims.

Those skilled in the art will recognize that many other implementations are possible and are consistent with the methods and apparatuses for discovery and notification of services.

References to "content" include data such as audio, video, text, graphics, and the like, that are embodied in digital or analog electronic form. References to "applications" include user data processing programs for tasks such as word processing, audio output or editing, video output or editing, digital still photograph viewing or editing, and the like, that are embodied in hardware and/or software. References to "services" include types of content such as audio, video, and images which include specific content items.

Figure 1:
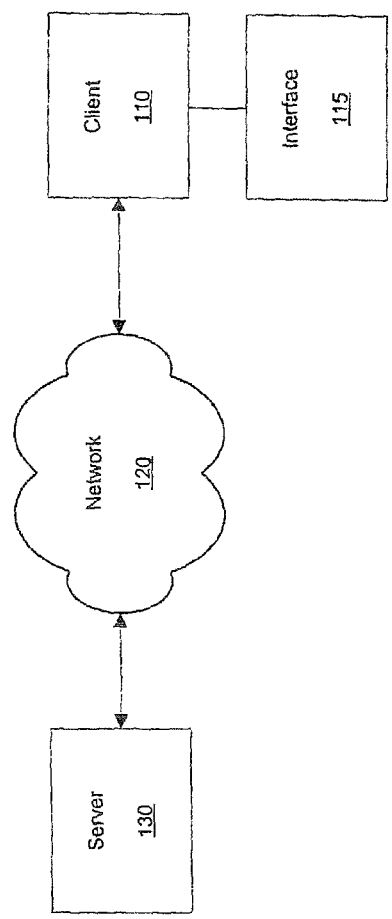
FIG. 1 is a diagram illustrating an environment within which the methods and apparatuses for discovery and notification of services are implemented.

FIG. 1 is a diagram illustrating an environment within which the methods and apparatuses for discovery and notification of services are implemented. The environment includes an electronic device 110 (e.g., a computing platform configured to act as a client device, such as a personal computer, a personal digital assistant, a cellular telephone, a paging device), a user interface 115, a network 120 (e.g., a local area network, a home network, the Internet), and a server 130 (e.g., a computing platform configured to act as a server).

In some embodiments, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device (mouse, trackball, etc.), a microphone, a speaker, a display, a camera) are physically separate from, and are conventionally coupled to, electronic device 110. The user uses interface 115 to access and control content and applications stored in electronic device 110, server 130, or a remote storage device (not shown) coupled via network 120.

In accordance with the invention, embodiments of discovery and notification of services as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

In some embodiments, the electronic device 110 is a content provider. As a content provider, the electronic device 110 is configured to add a new service, modify an existing service, add content to any service, designate recipients to be notified of new or changed services, or control access to services. In other embodiments, the electronic device 110 is a content user. As a content user, the electronic device 110 is configured to automatically be notified of new or changed services, discover new or changed services, or gather information related to the services and associated content.

Figure 2:
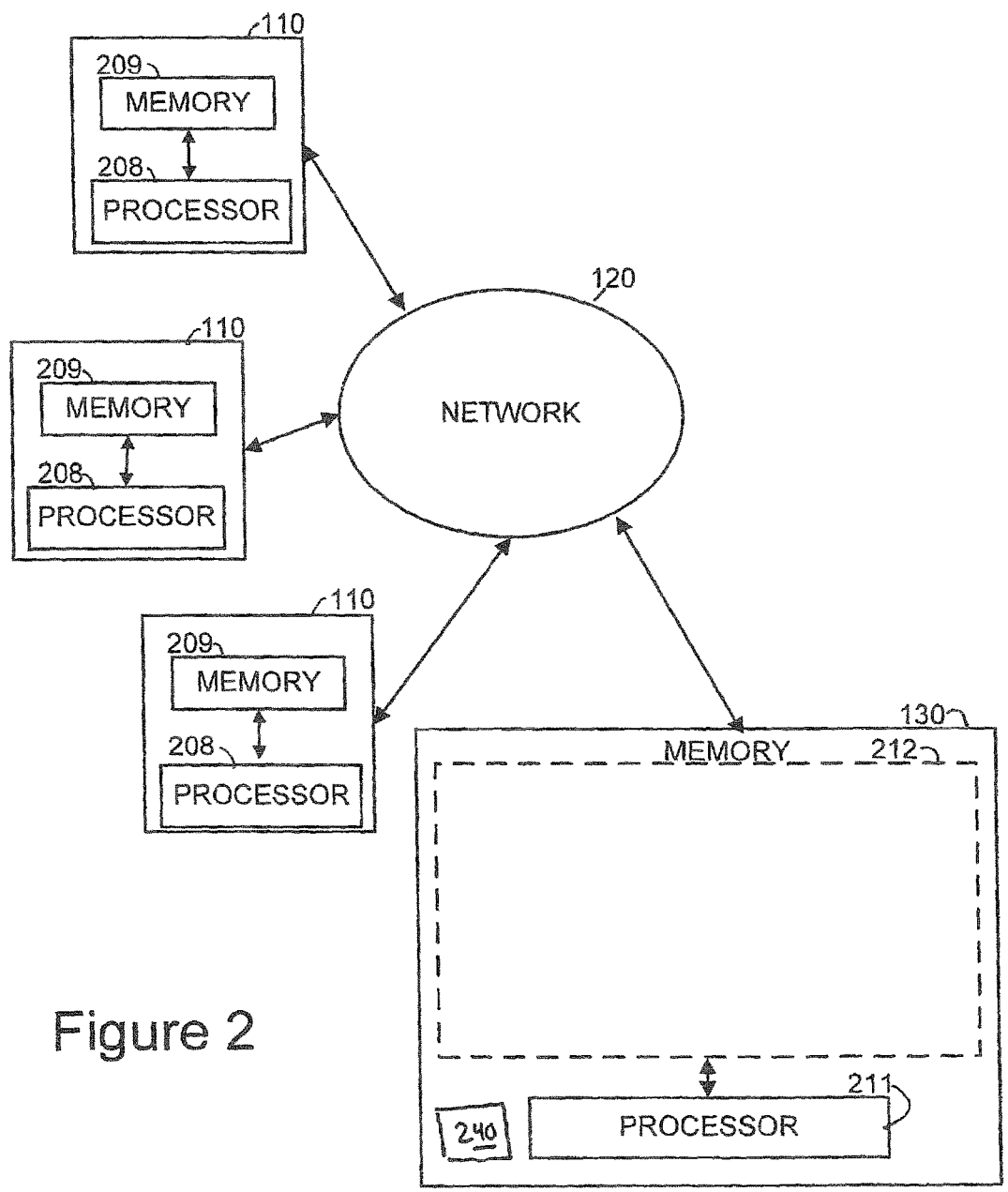
FIG. 2 is a simplified block diagram illustrating one embodiment in which the methods and apparatuses for discovery and notification of services are implemented.

FIG. 2 is a simplified diagram illustrating an exemplary architecture in which the methods and apparatus for discovery and notification of services are implemented. The exemplary architecture includes a plurality of electronic devices 110, server 130, and network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored, e.g., in the computer-readable medium 209. A unique user operates each electronic device 110 via an interface 115 as described with reference to FIG. 1.

Server 130 includes a processor 211 coupled to a computer-readable medium 212. In one embodiment, the server 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

One or more user applications are stored in media 209, in media 212, or a single user application is stored in part in one media 209 and in part in media 212. In one instance a stored user application, regardless of storage location, is made customizable based on discovery and notification of services as determined using embodiments described below.

The plurality of client devices 110 and the server 130 include instructions for a customized application for discovery and notification of services. In one embodiment, the plurality of computer-readable media 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

Figure 3:
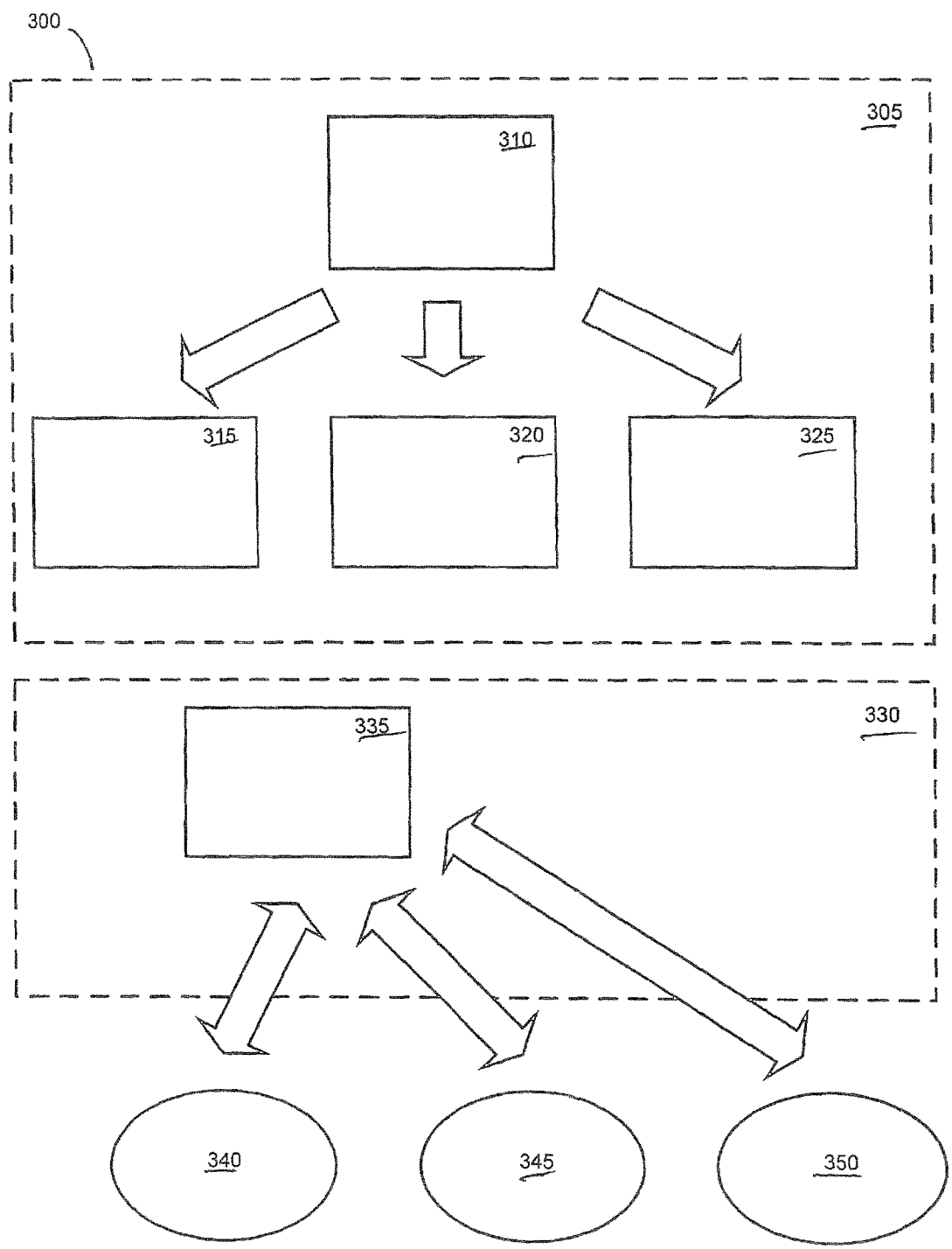
FIG. 3 is a simplified block diagram illustrating an exemplary embodiment of a registry in the methods and apparatuses for discovery and notification of services are implemented.

FIG. 3 is a simplified diagram illustrating an exemplary architecture hierarchy of a group of registries 300. In one embodiment, the registries 300 include a global registry 305 and a local registry 330. The registries 300 function as repositories of records and indices that describe parameters of audio/visual content.

In some embodiments, the global registry 305 is located within the server 130 (FIG. 1). In one embodiment, the global registry 305 includes a root registry 310 and second level registries 315, 320, and 325. In one instance, the root registry 310 is configured to synthesize and summarize the records contained within the second level registries 315, 320, and 325.

In some embodiments, the local registry 330 is located within the electronic device 110 (FIG. 1). In other embodiments, the local registry 330 is located within the server 130. For example, in one instance an exemplary local registry 335 is shown within the local registry 330.

In one embodiment, the exemplary local registry 335 is configured to be updated and viewed by the electronic devices 340, 345, and 350. The electronic devices 340, 345, and 350 are representative of the electronic device 110. For example, each of the devices 340, 345, and 350, is capable of updating a corresponding record within the local registry 335. In another example, the exemplary local registry 335 is configured to allow each of the devices 340, 345, and 350, to view a corresponding record.

In use, the registries 300 allow the devices 340, 345, and 350 to selectively edit, view, and receive records that are associated with audio/video content. In some embodiments, the registries 300 propagate these records internally. In other embodiments, the registries 300 make these records available to the devices 340, 345, and 350. In yet other embodiments, the registries 300 allow the devices 340, 345, and 350 to modify these records. In yet additional embodiments, the registries 300 selectively alert the devices 340, 345, and 350 of various changes and/or additions to the records.

For example, in one instance the device 340 acts as a service provider named "dad". The device 340 registers an audio/visual content such as a home-made video of his children's birthday party and thus creates a record within the local registry 335.

According to this example, at a later time the device 345 is notified via electronic mail, voicemail, pager message, or the like of the new content registered by the device 340. In one instance, the device 345 is notified through a recipient list which is associated with the record created by the device 340. In this example, the device 345 represents an entity "grandma". Although the device 350 is not on the recipient list for this particular record, the device 350 is capable of discovering this new audio/visual content. In this example, the device 350 represents an entity "brother" and is granted discovery rights by the record created by the device 340.

Any number of registries and devices can be utilized in a variety of configurations.

Figure 4:
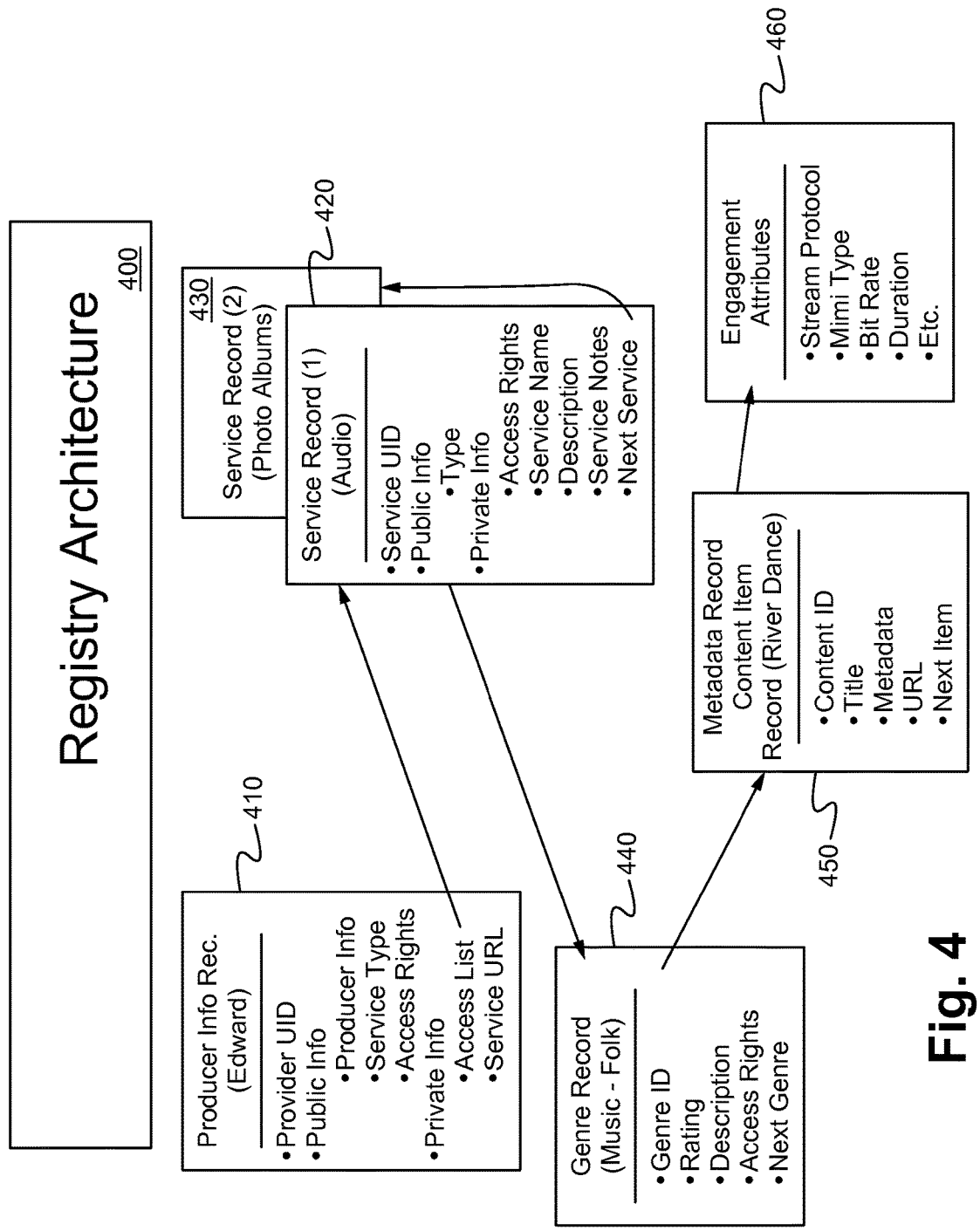
FIG. 4 is a simplified block diagram illustrating an exemplary embodiment of a registry architecture in which the methods and apparatuses for discovery and notification of services are implemented.

FIG. 4 is a simplified diagram illustrating an exemplary architecture hierarchy of a registry system 400. In one embodiment, the registry system 400 is utilized within the group of registries 300. The registry system 400 is configured to allow the methods and apparatuses for discovery and notification of services to utilize a synthesized architecture hierarchy of approach to discover and access content across a network. In some embodiments, the registry system 400 is utilized within the registries 315, 320, 325, and 330.

In some embodiments, the registry system 400 is organized into multiple sub-records. In one instance, the registry system 400 is organized into five sub-records. In another instance, the registry system 400 may be organized into any number of sub-records.

In some embodiments, the sub-records include a provider information record 410, a service record 420, a genre record 440, a content record 450, and an engagement record 460.

In one embodiment, the provider information record 410 is configured to store information corresponding to a particular content provider. For example, each provider information record 410 uniquely corresponds to a particular content provider. In one embodiment, the information stored within the provider information record 410 is organized into a provider user identification, public information, and private information.

In some embodiments, the provider user identification is a global and unique identifier used to differentiate among multiple content providers. In one instance, the provider user identification is represented by multiple alpha-numeric characters. In one embodiment, the provider user identification is freely distributed to possible interested parties seeking content that is provided by the particular content provider.

In some embodiments, the public information within the provider information record 410 describes the content provider as a company, organization, or a single user. Additionally, the public information also contains the type of service that is provided by the particular content provider. For example, the type of service includes music, video, pictures, and the like.

In some instances, the public information also includes access rights information. In one embodiment, access rights determine whether the service from the content provider is available or limited. For example, the content provider allows anyone to view the service. In another example, in one instance the content provider lists the users that have access to the service. In yet another example, the content provider notifies specific users when additional service is added by utilizing a recipient list.

In some embodiments, within the private information an access list is utilized to index the service record 420. In one instance, the private information is not available to other users.

In addition, a service URL is utilized to point to the location of the service record 420.

In some embodiments, the service record 420 describes a single service. Video, music, and photos are a few examples of the different services which are provided by the content provider. In some instances within the service record 420, information specific to the particular service is stored. For example, in one instance, the service record 420 references an audio service.

In one instance, the content provider registers multiple service types such as photos, videos, and the like. In some embodiments, a different service record is utilized for each unique service. A unique service identification is assigned to the service record 420. This unique service identification globally references a service type for specific providers.

Additional information is found within the service record 420 such as digital rights management, ratings, and service type. The ratings includes defined ratings such as the Motion Picture Association ratings (e.g. PG, PG-13, R) and user defined ratings based on user preferences and tastes. In addition, at least one pointer can be associated with a specific genre record such as the genre record 440.

Although a single service record 420 is described, it is contemplated that multiple service records are utilized. For example, a service record 430 is shown for a photo album service.

In some embodiments, the genre record 440 identifies specific topic categories within an associated service record. Exemplary topic categories for a photo album service include events such as birthdays, anniversaries, graduations, and holidays. Topic categories for an audio service include, e.g., folk, rock, classical, and jazz. In some embodiments, these specific topic categories are searched through a corresponding service record. For example, the service record 420 is shown as an audio service. The genre record 440 is shown as a genre record associated with the service record 420 and has the specific topic category of folk music. Although shown as a single genre record 440, in other embodiments, multiple genre records are associated with each service record.

In one embodiment, each genre record contains a reference to a content item record. In some embodiments; the content item record 450 is linked to the genre record 440. In some embodiments, the content item record 450 describes the content associated with the genre record 440. In some instances, the content is described by the content item record 450 in terms of title, author, producer, location of the content, and the like. In one instance, once a user discovers the content item record 450, additional information is obtained to determine many of the details about the associated content such as a specific video clip, a particular song, and the like. In this example, the content item record 450 corresponds with a song called "River Dance" within the "Folk Music" category through the genre record 440. In addition, in some embodiments, the content item record 450 also shows the location where the corresponding content item is stored.

In one embodiment, each content item record contains a reference to an engagement record.

In some embodiments, the engagement record 460 provides parameters that allow the content to engage the corresponding content item and service. In one embodiment, these parameters indicate the necessary prerequisites to access the content item. For example, these parameters include the necessary streaming protocols, recipient lists, system bandwidth, and the like to access the content item.

Figure 5:
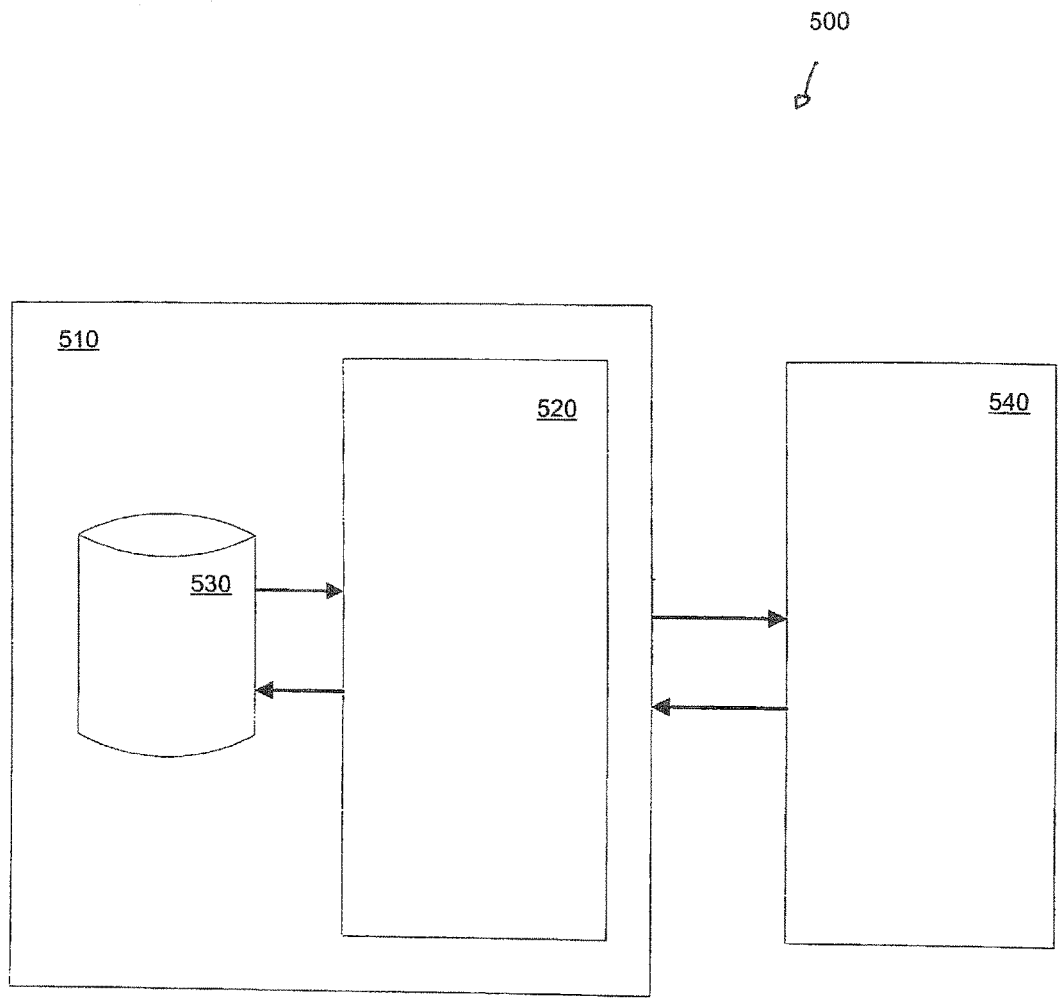
FIG. 5 is a simplified block diagram illustrating an exemplary registry system, consistent with one embodiment of the methods and apparatuses for discovery and notification of services.

FIG. 5 is a simplified diagram illustrating a service registry system 500. In one embodiment, the service registry system 500 is implemented in the electronic device 110. In another embodiment, the service registry system 500 is implemented in the server 130. In one embodiment, the service registry system 500 stores information related to a content provider, type of service offered by the content provider, and particulars regarding the content items accessible using the service. In another embodiment, the service registry system 500 selectively and automatically notifies a content user of a new service. In yet another embodiment, the service registry system 500 allows the content provider to update available services and content information.

The service registry system 500 includes a service registry module 510 and a proxy 540. The service registry module 510 provides the functionality to the service registry system 500. In one embodiment, the service registry module 510 is embodied within a server 130.

In some embodiments, the proxy 540 is utilized by the content provider. In other embodiments, the proxy 540 is utilized by the content user. The proxy 540 is embodied within an electronic device 110. The service registry module 510 and the proxy 540 are configured to communicate with each other via a network including but not limited to microwave transmission, cellular transmission, infrared transmission, optical transmission, wired transmission, and the like.

In one embodiment, the service registry 510 includes a publisher storage module 530 and a discovery and notification server 520. In one embodiment, the publisher storage module 530 stores content (which does not include metadata) related to the content provider and associated information such as the records and sub-records illustrated within the record registry system 400 (FIG. 4). For example, the content stored within the publisher storage module 530 includes information relating to content provider, recipient list, service type, access rights, genre, metadata, and engagement.

In addition to storing information related to the content provider and corresponding services and associated content, the publisher storage module 530 stores a recipient list and access rights in other embodiments. In one embodiment, the recipient list represents a list of content users which are selected by the content provider to be notified when new services are introduced by the content provider. In one instance, this notification is performed via electronic messages.

In one embodiment, the access rights stored within the publisher storage module 530 allow the content provider to selectively identify a content user to discover services and access content associated with the content provider.

In one embodiment, the discovery and notification server 520 provides notification of new services to content users that are identified within the recipient list. In addition, the discovery and notification server 520 allows the content provider to add and modify services and associated content. Similarly, the discover and notification server 520 allows the content users to discover services and access associated content.

Figure 6:
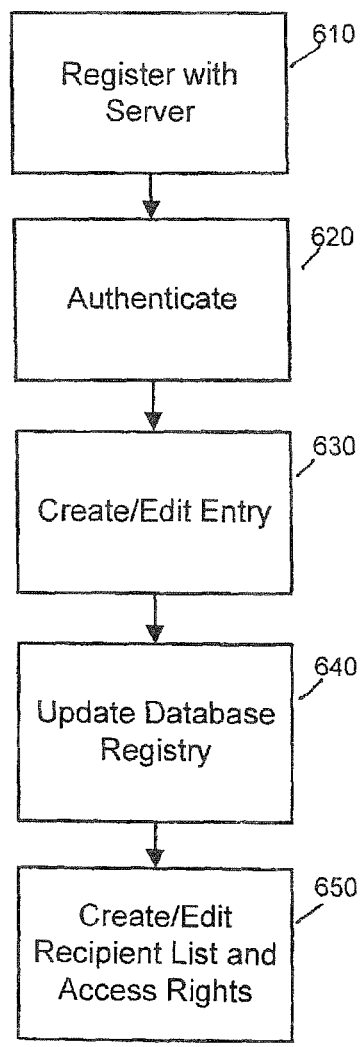
FIG. 6 is a flow diagram, consistent with one embodiment of the methods and apparatuses for discovery and notification of services.
Figure 7:
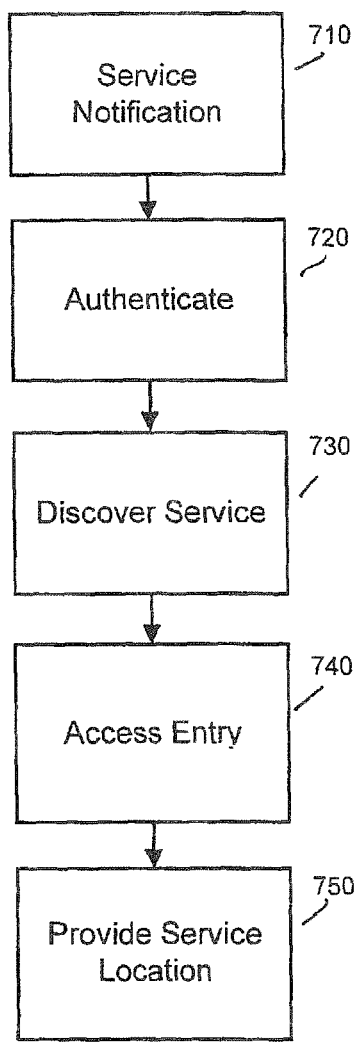
FIG. 7 is a flow diagram, consistent with one embodiment of the methods and apparatuses for discovery and notification of services.
Figure 9:
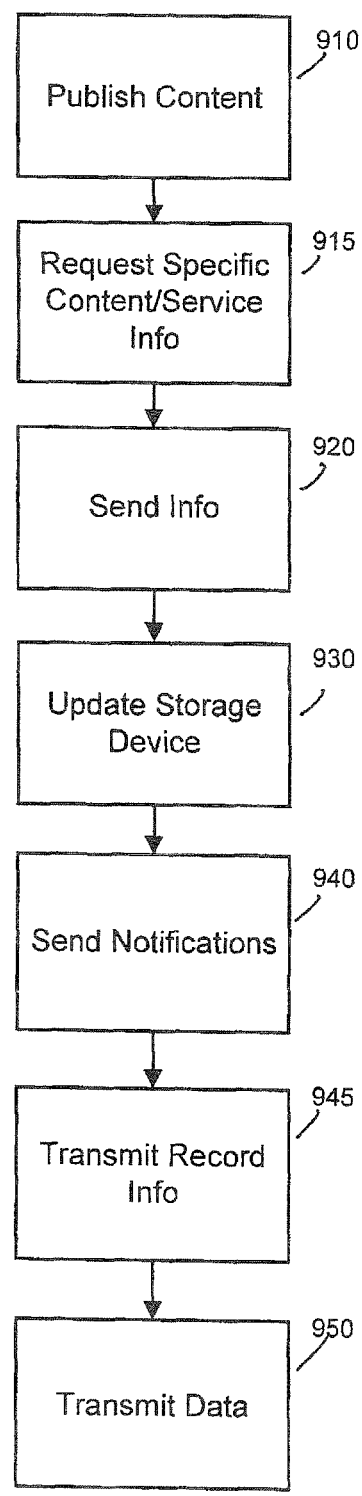
FIG. 9 is a flow diagram, consistent with one embodiment of the methods and apparatuses for discovery and notification of services.

The flow diagrams as depicted in FIGS. 6, 7, and 9 are illustrative embodiments of methods and apparatuses for discovery and notification of services. In each embodiment, the flow diagrams illustrate various applications corresponding with the registry system 500.

The blocks within the flow diagram may be performed in a different sequence without departing from the spirit of the methods and apparatuses for discovery and notification of services. Further, blocks may be deleted, added, or combined without departing from the spirit of the methods and apparatuses for discovery and notification of services.

FIG. 6 illustrates a method that allows a content provider to interact with the service registry module 510. The content provider interacts with the service registry module 510 through the proxy 540.

In Block 610, the content provider registers with the service registry module 510. If this is an initial use of the service registry module 510, the content provider is prompted to complete basic content provider information such as name, address, identification, and the like.

In Block 620, the identity of the content provider is authenticated prior to granting the content provider the ability to access, add, and/or modify information associated with the particular content provider. The content provider is authenticated through a password, a digital certificate, and the like. In one embodiment, authentication provides protection against unauthorized access to records belonging to the content provider.

In Block 630, the content provider edits or adds a record contained within the publisher storage module 530. Any record accessible to the content provider is capable of being modified or added within the registry system 500. For example, the content provider adds a new service record 420 for a different type of service such as audio music. Along with the new service record 420 for audio content, the content provider also initiates a genre record 440 of rock music under the service type of audio content. In addition, the content provider initiates a content item record 450 associated with a particular rock song to be within the rock music genre record.

In another example, the content provider changes an existing content item record 450 when the location of the content item has changed. In particular, the newly changed content item record 450 contains the new location of the associated content item.

In Block 640, the publisher storage module 530 is updated to include any additions or modifications to records initiated by the content provider.

In Block 650, the content provider creates or modifies a recipient list. In one embodiment, the selected content users named on the recipient list are chosen to be notified when a new service is introduced by the content provider. For example, the content users within the recipient list are notified when the content provider introduces a new service such as audio music, home videos, photographs, and the like. In another embodiment, the content users within the recipient list are notified when the content provider introduces new content within an existing service such as a particular new song, a particular new photograph, and the like. This notification of content users occurs through an electronic message.

In addition, in another embodiment, the content provider also creates or modifies access rights for content users. Through access rights, the content provider only provides access to records associated with the content provider for selected content users. For example, an access rights list identifies content users which are given permission to discover and utilize the records and corresponding content belonging to the content provider. In one embodiment, content users have limited access to content based, in part, on the particular content. In another embodiment, content users have limited access to services based, in part, on the particular service. In yet another embodiment, content users are denied all access to records and corresponding content related to the specific content provider.

FIG. 7 illustrates a method that allows a content user to interact with the service registry 510. The content user interacts with the service registry 510 through the proxy 540.

In Block 710, a content user receives a service notification from the service registry 510. The notification and discovery server 520 initiates the notification to the specific content user based on the recipient list, which is stored within the publisher storage module 530. In one embodiment, the notification of the content user is initiated based, in part, on the introduction of a new service by the content provider. The actual notification of the content user occurs via an electronic message.

In Block 720, the identity of the content user is authenticated prior to granting the content user the ability to discover the service associated with the particular content provider. The content user is authenticated through a password, a digital certificate, and the like. In one embodiment, the discovery and notification server 520 also prevents access by the content user based on access rights that are determined by the content provider.

In Block 730, the content user discovers at least one service and associated content. In one embodiment, the content user discovers the new service in response to the service notification. In another embodiment, the content user also discovers the content associated with the new service. In yet another embodiment, the content user discovers any number of service and associated content.

In Block 740, the publisher storage module 530 is accessed by the discovery and notification server 520. The publisher storage module 530 is accessed at various times. In one embodiment, the publisher storage module 530 is accessed to check the content user for access rights and/or inclusion within the recipient list. In another embodiment, the publisher storage module 530 is accessed to find a location of a service and/or content associated with a particular service.

In Block 750, a location of the service record 420 is provided to the content user. The location of the service corresponds with a logical representation of the particular service. In addition to the location of the service record, a location of the content associated with a particular service may also be provided to the content user. For example, the location of content is represented by a reference such as a URL which points to a unique address within the Internet.

Figure 8:
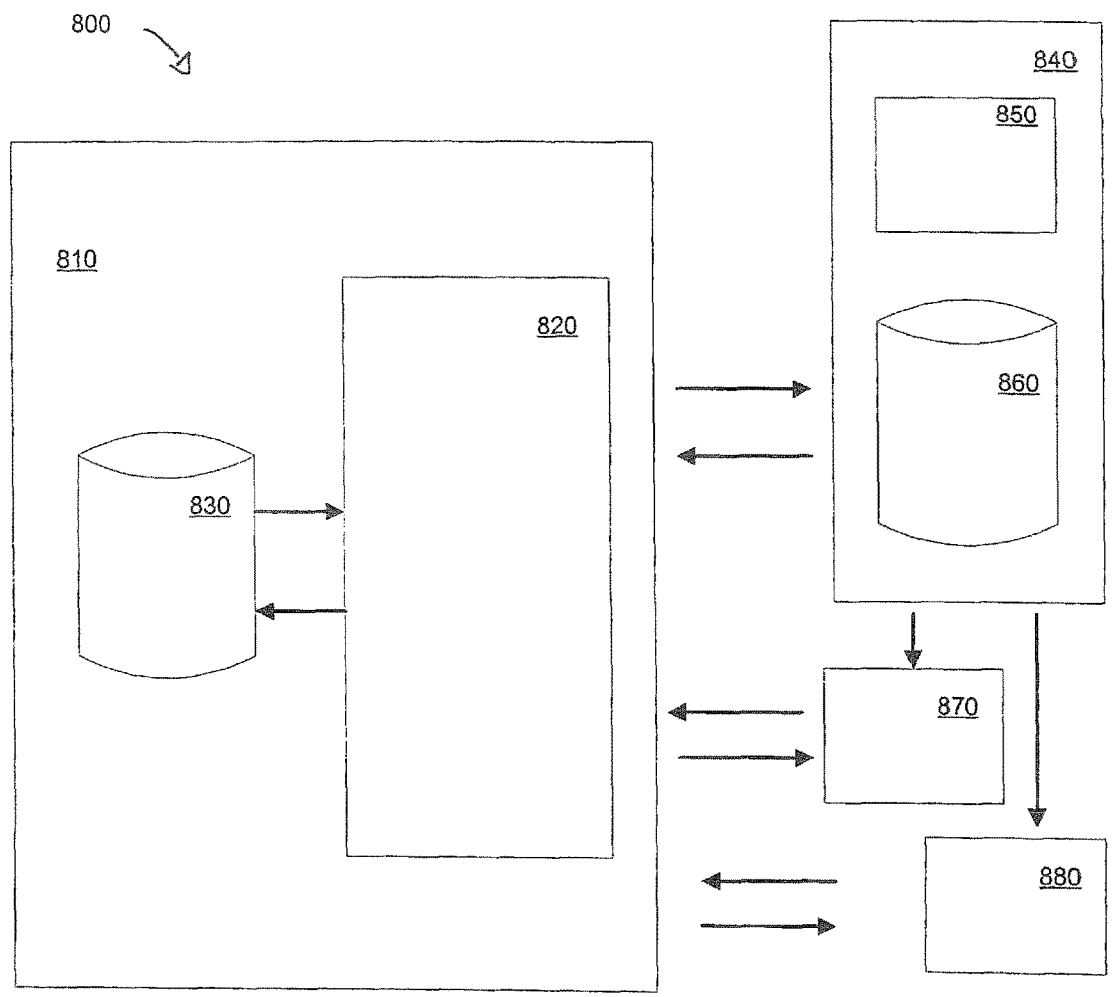
FIG. 8 is a simplified block diagram illustrating a second exemplary registry system, consistent with one embodiment of the methods and apparatuses for discovery and notification of services.

FIG. 8 is a simplified diagram illustrating a second service registry system 800. In one embodiment, the service registry system 800 stores information related to a content provider, type of service offered by the content provider, and particulars regarding the content items accessible using the server. In another embodiment, the service registry system 800 selectively and automatically notifies a content user of a new service. In yet another embodiment, the service registry system 800 allows the content provider to update available services and content information.

The service registry system 800 includes a service registry module 810, a content provider module 840, a content user module 870, and a content user module 880.

In one embodiment, the service registry module 810 is configured to provide the functionality to the service registry system 800. In one embodiment, the service registry module 810 is embodied within a server (e.g., 130).

In one embodiment, the content provider module 840 is utilized by the content provider. The content provider module 840 includes a content provider server 850 and a content storage module 860. The content provider server 850 assists the content provider in storing content items. The content storage module 860 stores content items associated with the content provider.

The content user modules 870 and 880 each represent separate content users that are configured to selectively access records within the service registry module 810 and access content items within the content provider module 840.

The service registry module 810, the content provider module 840, the content user module 870, and the content user module 880 communicate via a network including but not limited to microwave transmission, cellular transmission, infrared transmission, optical transmission, wired transmission, and the like.

In one embodiment, the service registry 810 includes a publisher storage module 830 and a discovery and notification server 820. In one embodiment, the publisher storage module 830 stores records and indices related to the content provider and associated information such as the records and sub-records illustrated within the record registry system 400 (FIG. 4). For example, the information stored within the publisher storage module 830 includes content relating to content provider, recipient list, service type, access rights, genre, metadata, and engagement.

In addition to storing information related to the content provider and corresponding services and associated content, the publisher storage module 830 stores a recipient list and access rights. In one embodiment, the recipient list represents a list of content users that are selected by the content provider to be notified when new services are introduced by the content provider. This notification is performed via electronic messages.

In one embodiment, the access rights stored within the publisher storage module 830 allow the content provider to selectively identify a content user to discover services and access content associated with the content provider.

In one embodiment, the discovery and notification server 820 provides notification of new services to content users which are identified within the recipient list. In addition, the discovery and notification server 820 allows the content provider to add and modify services and associated content. Similarly, the discover and notification server 820 allows the content users to discover services and access associated content.

FIG. 9 illustrates a method that allows a content provider and at least one content user to interact with the service registry 810. The content user interacts with the service registry 810 through the content user modules 870 and 880. The content provider interacts with the service registry 810 through the content provider module 840.

In Block 910, the content provider notifies the service registry 810 of new content published by the content provider. In one embodiment, the content provider interacts with the service registry 810 through the content provider module 840. In one embodiment, the content provider also includes record information corresponding to the new content. This record information includes a service type, a specific genre, and the like.

In Block 915, the service registry 810 requests additional information relating to the new content. This additional information includes information relating to the service type and/or the new content. For example, if the new content includes a new service, the service registry 810 requests information pertaining to a service record. In another example, if the new content is related to an existing service, the service registry 810 requests genre information pertaining to the specific new content.

In Block 920, the content provider responds and submits information requested by the service registry 810.

In Block 930, the records within the publisher storage module 830 are updated in response, in part, to the information submitted by the content provider.

In Block 940, a notification is selectively transmitted from the service registry 810 to the content user modules 870 and 880. In one embodiment, the notification is transmitted based, in part, on whether the content user modules 870 and 880 are identified within the recipient list. Further, the notification is transmitted also based, in part, on whether a new service has been added to the service registry 810.

In Block 945, record information is selectively transmitted from the service registry 810 to the content user modules 870 and 880. In one embodiment, the record information is selectively transmitted based, in part, on whether the content user modules 870 and 880 have authorized access rights. Further, the record information is selectively transmitted based, in part, on the specific requests of the content user modules 870 and 880.

In Block 950, the content associated with the new service is transmitted from the content storage module 860 based, in part, on information within the record.

The foregoing embodiment associated with FIG. 9 refers to a new service. However, in another embodiment, a modified or updated service is substituted for a new service without departing from the methods and apparatuses for discovery and notification of services. Further, a modified service includes changes in an existing service or changes in content associated with the existing service.

What is claimed:

1. A method executing in hardware of and programmed in a memory of a device comprising:
   identifying a content provider, including a provider information record configured to store a unique provider user identification, public information and private information that is only available to the content provider;
   identifying a service wherein the service corresponds with the content provider;
   forming a service record within a service registry wherein the service record represents the service; and
   allowing a content user to discover the service through the service registry, wherein a root registry of the device is configured to synthesize and summarize records contained within second level registries, wherein the records include the service record.

2. The method according to claim 1, further comprising associating content with the service through a content record.

3. The method according to claim 1, further comprising associating a genre with the service through a genre record.

4. The method according to claim 1, further comprising identifying a protocol associated with the service through an engagement record.

5. The method according to claim 1, wherein the service includes one of a document, an image, audio data, and video data.

6. The method according to claim 1, wherein the allowing further comprising checking access rights of the content user.

7. The method according to claim 1, further comprising selectively notifying the content user of the service via a recipient list.

8. The method according to claim 7, wherein the recipient list contains at least one content user.

9. The method according to claim 1, further comprising authenticating an identity of the content provider.

10. The method according to claim 1, further comprising adding a content record within the service registry wherein the content record is associated with a particular content.

11. The method according to claim 1, further comprising storing the service record within the service registry.

12. A method executing in hardware of and programmed in a memory of a device comprising:
    identifying a content user;
    allowing the content user to discover a service within a service registry wherein the service corresponds with a content provider, wherein the service registry includes a provider information record configured to store a unique provider user identification, public information and private information that is only available to the content provider; and
    displaying a content record associated with a content corresponding to the service wherein the content record provides parameter information relating to the content, wherein a root registry of the device is configured to synthesize and summarize records contained within second level registries, wherein the records include the content record.

13. The method according to claim 12, further comprising authenticating an identity of the content user.

14. The method according to claim 12, further comprising searching for the content record through a genre record, wherein the genre record corresponds to the service.

15. The method according to claim 12, further comprising identifying a protocol associated with the service through an engagement record.

16. The method according to claim 12, wherein the service includes one of a document, an image, audio data, and video data.

17. The method according to claim 12, further comprising checking access rights of the content user prior to allowing the content user to discover the service.

18. The method according to claim 12, further comprising selectively notifying the content user of the service via a recipient list.

19. The method according to claim 12, further comprising storing the service record within the service registry.

20. A method executing in hardware of and programmed in a memory of a device comprising:
    identifying a registry system, wherein the registry system includes a plurality of records wherein each record represents a service, including a provider information record configured to store a unique provider user identification, public information and private information that is only available to a content provider;
    searching within the registry system based on a search criteria; and
    displaying at least one record in response to the search criteria, wherein a root registry of the device is configured to synthesize and summarize records contained within second level registries.

21. The method according to claim 20, wherein the search criteria is a protocol supported by the service.

22. The method according to claim 20, wherein the search criteria is a content description describing the service.

23. The method according to claim 20, wherein the search criteria is a genre type describing a category of the service.

24. A registry system comprising:
    a storage module configured for storing a provider record and a service record wherein, the provider record represents a content provider and a service associated with the content provider, wherein the provider record is configured to store a unique provider user identification, public information and private information that is only available to the content provider, and the service record represents the service associated with the content provider; and
    a control module configured for selectively allowing access to the provider record and the service record based on access rights of a content user, wherein a root registry of the device is configured to synthesize and summarize records contained within second level registries, wherein the records include the service record.

25. The system according to claim 24, wherein the service record includes a protocol type for identifying at least one protocol supported by the service.

26. The system according to claim 25, wherein the protocol includes one of UPnP, HTP, and RTP.

27. The system according to claim 24, wherein the storage module is configured for storing a recipient list wherein the recipient list identifies at least one content user for receiving a notification of the service.

28. The system according to claim 24, wherein the storage module is configured for storing the access rights wherein the access rights identify an allowed content user with permission to access the service.

29. The system according to claim 24, wherein the storage module is configured for storing a genre record for describing a category of the service.

30. A method executing in hardware of and programmed in a memory comprising:
  identifying a content provider;
  identifying a service wherein the service corresponds with the content provider;
  forming a service record within a service registry wherein the service record represents the service, wherein the service registry includes a provider information record configured to store a unique provider user identification, public information and private information that is only available to the content provider; and
  allowing a content user to discover the service through the service registry, wherein a root registry of the device is configured to synthesize and summarize records contained within second level registries, wherein the records include the service record.

* * * * *